No. 11,753. Reissued June 27, 1899.

S. L. LUTHER.

GLOVE.

(Application filed June 24, 1898.)

Witnesses:
C. L. Raeder
Thomas C. Turpin

Inventor
Sarah L. Luther
By Jas. J. Sheehy
Attorney

UNITED STATES PATENT OFFICE.

SARAH L. LUTHER, OF BERLIN, WISCONSIN, ASSIGNOR OF ONE-HALF TO FRANK H. RUSSELL AND WILL C. RUSSELL, OF SAME PLACE.

GLOVE.

SPECIFICATION forming part of Reissued Letters Patent No. 11,753, dated June 27, 1899.

Original No. 592,060, dated October 19, 1897. Application for reissue filed June 24, 1898. Serial No. 684,436.

*To all whom it may concern:*

Be it known that I, SARAH L. LUTHER, of Berlin, in the county of Green Lake and State of Wisconsin, have invented certain new and useful Improvements in Gloves; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

My invention relates to gloves which are constructed with a view of withstanding rough usage, and contemplates providing a shield on the front or palm side of a glove where a thumb or finger receiving member is joined to the body thereof, the said shield being formed of a piece of suitable material which is folded upon itself, has its edges interposed between and connected by stitches to the contiguous edges of the body and thumb or finger receiving member, and has its bight portion extended a considerable distance beyond the surfaces of the body and thumb or finger receiving member, whereby said bight portion is enabled to spread over and cover the seams and at the same time form a projection. By covering the seams the bight portion of the shield is enabled to exclude dirt and moisture from the thread forming the stitches and the portions of the body and thumb or finger receiving member engaged thereby, so as to prevent rotting or other deterioration thereof, and by forming a projection said bight portion is enabled to prevent frictional wear of the thread forming the stitches and the portions of the body and thumb or finger receiving member adjacent thereto when the glove is in use. From this it follows that by reason of my improvements the connection of a thumb or finger receiving member to the body of the glove is materially strengthened and reinforced and that liability of the seam or seams ripping and the thumb or finger receiving member pulling away from the body portion is removed.

With the foregoing in view the invention will be fully understood from the following description and claims when taken in connection with the annexed drawings, in which—

Figure 1:
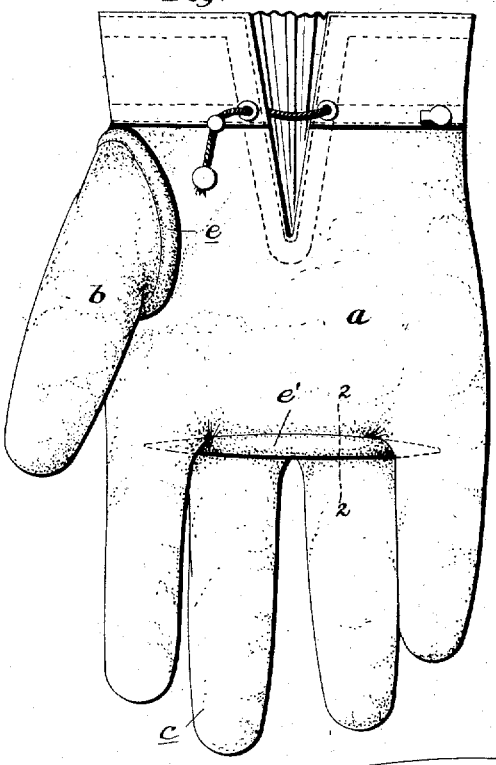
Figure 2:
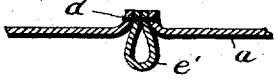
Figure 4:
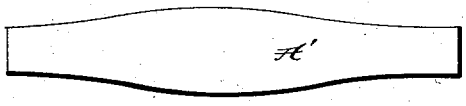
Figure 3:
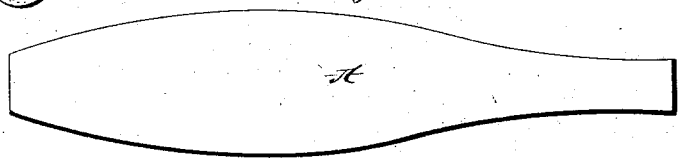

Figure 1 is a plan view of a glove embodying my invention. Fig. 2 is a slightly-enlarged detail transverse section on line 2 2 of Fig. 1. Fig. 3 is an enlarged detail view of the shield employed to cover the seams between the thumb-receiving member and the body portion of the glove, and Fig. 4 is a similar view of the shield for covering the seams between the inner ends of the front side of the two middle-finger-receiving members and the body portion.

In the said drawings similar letters designate corresponding parts in all of the several views.

In the present embodiment of my invention the glove comprises a body *a*, a thumb-receiving member *b*, and finger-receiving members *c*, and my improvements are employed in the connection of the inner side of the thumb-receiving member to the palm portion of the body and the connection of the inner ends of the front side of the two middle-finger-receiving members to said body. The body and the thumb and finger receiving members are formed of suitable tanned skin or other material suitable to the purpose.

A is the shield for strengthening and protecting the connection of the thumb-receiving member *b* to the palm of body *a*, and A′ is the shield for strengthening and protecting the connection of the two middle-finger-receiving members to the palm of the body. These shields are preferably formed of buckskin, which, being at once soft and tough, is admirably adapted for the purpose.

The shield A is of the form or approximate form shown—that is to say, is wide at its middle and is tapered or gradually reduced in width toward its opposite ends. In applying said shield it is folded upon itself and its edges are interposed between the inner side of the member *b* and the palm portion of the body and is connected to the same by stitches *d* after the manner shown in Fig. 2. With this done it will be seen that a bight *e* is afforded, which projects a considerable distance from the thumb and palm portion of the body, and that by reason of the shield being tapered toward its opposite ends, as before described, the ends of said bight are diminished in size, so as to properly join with the welt usually employed at the back of the thumb-receiving member *b*, and thereby prevent sand and the like from getting inside of the shield and wearing it out. The bight *e* by reason of the curvature of shield A lies over upon the thumb-receiving member, and therefore does not interfere with anything being grasped in the glove or render the glove uncomfortable to the wearer. At the same time said bight portion *e* spreads over and covers the seam between the shield and the member *b* and the seam between the shield and the body *a* and by excluding dirt and moisture therefrom prevents rotting or other deterioration of the thread forming the connecting-stitches and the portions of glove engaged thereby. It also forms a projection which holds the seams away from anything grasped by the glove, and thereby prevents frictional wear of the thread forming the stitches and the portions of the body *a* and member *b* engaged thereby. This is obviously an important advantage, inasmuch as the friction between the palm of a glove and articles grasped therein is what generally causes wear of the contiguous portions of the body and members of a glove and the connecting-stitches engaging the same and results in the members tearing away from the body of the glove at the palm side thereof. Being protected against dirt, moisture, and frictional wear, the connection of the member *b* to the body *a* will not be deteriorated or weakened by the use of the glove, and hence there is no liability of the same ripping or the member *b* pulling away from the body *a*.

The shield A′ is of the form or approximate form shown in Fig. 4, being of the greatest width at its middle and tapered or gradually reduced in width toward its ends. In applying this shield it is folded upon itself and its edges are interposed between the body *a* and the inner ends of the front side of the middle-finger-receiving members and connected to the same by stitches. The terminal ends of the said shield extend back of the index and little finger receiving members and are secured thereto, said terminal ends by reason of their being reduced in size being adapted to properly join with the welts usually provided at the side of the said index and little finger receiving members, and thereby prevent the entry of sand and grit into the shield A. The bight *e′* projects a considerable distance from the surface of the body and finger-receiving members and, like the bight *e* of the shield A, is adapted to spread over and cover the seams and at the same time form a projection to protect the thread forming the stitches and the contiguous portions of the body and finger-receiving members against frictional wear.

From the foregoing it will be appreciated that while my improvements reinforce and greatly strengthen the connection of the thumb and finger receiving members to the body they are very simple and do not materially increase the difficulty attending the making of the glove or the cost thereof.

Having thus described my invention, what I claim is—

1. The herein-described glove comprising a body, a member, a shield folded transverse the direction of its width upon itself and having its edges interposed between and connected by stitches to the contiguous edges of the palm portion of the body and the inner side of the member and also having the bight portion extending beyond the surfaces of the body and member and spread over and covering the seams and forming a protecting projection at the palm side of the glove, substantially as specified.

2. The herein-described glove comprising a body, a member, and a shield diminished in width at its opposite ends and folded transverse the direction of its width upon itself and having its edges interposed between and connected by stitches to the contiguous edges of the palm portion of the body and the inner side of the member and also having a bight portion extending beyond the surfaces of the body and member and spread over and covering the seams and forming a protecting projection at the palm side of the glove, substantially as specified.

3. The herein-described glove, the front side of the middle-finger-receiving members of which is separate from the body of the glove, and a shield folded transverse the direction of its width upon itself and having its edges interposed between the contiguous edges of the body and finger-receiving members and its terminal ends secured at the back of the index and little finger receiving members and also having the bight portion extending beyond the surfaces of the body and members and spread over and covering the seams and forming a protecting projection at the palm side of the glove, substantially as specified.

In testimony whereof I affix my signature in the presence of two witnesses.

SARAH L. LUTHER.

In presence of—
EVA THOMPSON,
J. P. LUTHER.